(12) United States Patent
Cuomo

(10) Patent No.: US 12,509,180 B2
(45) Date of Patent: Dec. 30, 2025

(54) FOOT RETENTION SYSTEM FOR A PEDAL

(71) Applicant: Stephen Michael Cuomo, Pelham, NY (US)

(72) Inventor: Stephen Michael Cuomo, Pelham, NY (US)

( * ) Notice: Subject to any disclaimer, the term of this patent is extended or adjusted under 35 U.S.C. 154(b) by 194 days.

(21) Appl. No.: 18/117,265

(22) Filed: Mar. 3, 2023

(65) Prior Publication Data

US 2023/0339569 A1    Oct. 26, 2023

Related U.S. Application Data

(60) Provisional application No. 63/335,196, filed on Apr. 26, 2022.

(51) Int. Cl.
*B62M 3/08* (2006.01)

(52) U.S. Cl.
CPC .................... *B62M 3/083* (2013.01)

(58) Field of Classification Search
CPC ......... B62M 3/083; A43B 5/14; Y10T 74/217
See application file for complete search history.

(56) References Cited

U.S. PATENT DOCUMENTS

| | | | | |
|---|---|---|---|---|
| 23,893 A | * | 5/1859 | Behr | A63C 17/02 280/11.32 |
| 25,035 A | * | 8/1859 | Norton | A63C 17/02 280/11.3 |
| 31,348 A | * | 2/1861 | Clark | A63C 17/02 280/11.32 |
| 35,358 A | * | 5/1862 | Bauer | A63C 17/02 280/11.33 |
| 35,722 A | * | 6/1862 | Wellsteed | A63C 17/02 280/11.31 |
| 109,935 A | * | 12/1870 | Platt | A63C 17/02 280/11.31 |
| 242,904 A | * | 6/1881 | Everitt | A63C 17/02 280/11.32 |
| 972,489 A | * | 10/1910 | Adams | H01R 4/643 24/20 LS |
| 1,992,505 A | * | 2/1935 | Prosky | F16L 33/08 24/274 R |
| 2,680,021 A | * | 6/1954 | Sbarra | A63B 22/0605 482/65 |

(Continued)

FOREIGN PATENT DOCUMENTS

| | | | | |
|---|---|---|---|---|
| GB | 2124165 | * | 2/1984 | ............ B62M 3/083 |
| WO | WO-2021183909 A1 | * | 9/2021 | ......... A61B 17/1327 |

(Continued)

OTHER PUBLICATIONS

Written Opinion of The International Searching Authority of PCT/US23/85051, Feb. 23, 2024 (Year: 2024).*

*Primary Examiner* — Thomas C Diaz

(57) ABSTRACT

A foot retention system including: a pedal having a pedal platform; a strap having a first base portion, a second base portion and a loop portion between base portions; and a rotary adjuster connected to said strap. The first base portion and said second base portion are retained to the pedal platform and the loop portion is vertically spaced from the pedal platform. The strap and pedal platform defines an opening to receive a user's foot and the rotary adjuster is rotatable about a rotary axis to adjust the perimeter length of the opening.

26 Claims, 10 Drawing Sheets

(56) References Cited

U.S. PATENT DOCUMENTS

| | | | | |
|---|---|---|---|---|
| 3,426,401 | A * | 2/1969 | Denyes | F16L 33/10 |
| | | | | 24/274 R |
| 4,172,392 | A * | 10/1979 | Foster | B62L 3/00 |
| | | | | 280/294 |
| 4,327,602 | A * | 5/1982 | Le Bec | B62M 3/083 |
| | | | | 74/594.6 |
| 4,638,685 | A * | 1/1987 | Cigolini | B62M 3/083 |
| | | | | 280/294 |
| 4,846,461 | A * | 7/1989 | Robards, Jr. | A63B 22/0076 |
| | | | | 482/145 |
| 4,945,787 | A * | 8/1990 | Bigolin | B62M 3/083 |
| | | | | 36/131 |
| 6,393,941 | B1 | 5/2002 | Liu | |
| 11,091,222 | B1 * | 8/2021 | Hsieh | B62M 3/086 |
| 2002/0189395 | A1 * | 12/2002 | Vito | B62M 3/083 |
| | | | | 74/594.6 |
| 2012/0137826 | A1 | 6/2012 | Lin | |
| 2014/0097283 | A1 * | 4/2014 | So | A44B 99/00 |
| | | | | 242/404 |
| 2023/0137746 | A1 * | 5/2023 | Rovekamp | A61F 5/0102 |
| | | | | 602/16 |
| 2024/0253731 | A1 * | 8/2024 | Loper | B62M 3/083 |

FOREIGN PATENT DOCUMENTS

| | | | | |
|---|---|---|---|---|
| WO | WO-2022256523 A1 * | 12/2022 | | B62M 3/083 |
| WO | WO-2024186374 A1 * | 9/2024 | | B62M 3/083 |

* cited by examiner

FOOT RETENTION SYSTEM FOR A PEDAL

CROSS-REFERENCE TO RELATED APPLICATIONS

This application claims priority of U.S. Provisional Patent application 63/335,196, filed Apr. 12, 2022.

BACKGROUND OF THE INVENTION

The present invention relates to a system for securing a user's foot to a pedal or other foot-supporting platform, where a "toe strap" serves to position and/or secure the rider's foot to the platform of the pedal. The toe strap and platform cooperate to provide an opening to receive the user's foot. The effective length of the toe strap is adjustable by means of a rotary adjuster, such that manual rotation of the adjuster serves to vary the size of the opening and thus serves to vary the fitment between the toe strap and the foot. The system may have a looser fit with the foot as an aid to position the foot on the platform or may have a tighter fit with the foot for a more secure connection between the foot and the platform or may have a loosened fit with the foot to facilitate insertion of the foot within the opening and/or withdrawal of the foot from the opening.

BACKGROUND—DISCUSSION OF PRIOR ART

It is well established that securing and/or positioning a cyclist's foot to a pedal helps ensure safety by preventing their foot from slipping off the pedal and also by improving pedaling smoothness and efficiency. This has traditionally been achieved by conventional toe straps and toe clips. US patent application number 2012/0137826 (FIGS. 2, 3, and 5) describes one example of such a conventional toe clip and strap arrangement. The effective length of these conventional toe straps is commonly adjustable by means of a buckle. However, this buckle is notoriously difficult to reach with the user's hand (while seated on the bicycle) for manual manipulation and to release the foot from the pedal. Also, this buckle is not very intuitive to operate and requires training on the part of the user. Many users find the buckle difficult to operate and to precisely adjust while seated on a cycle.

In other applications, particularly with the pedals of stationary exercise bicycles, the toe clip is omitted and only the toe strap is included. U.S. Pat. No. 6,393,941 (FIG. 1) describes one example of such a conventional arrangement that uses only a toe strap. The effective length of this toe strap is commonly adjusted by engaging one of several holes along the length of the strap with a single peg of the pedal platform. Once engaged, the length of the strap is fixed and is not easily adjusted. This is generally a low-performance application and does not allow the user to easily tighten or loosen the strap when the user's foot is positioned on the platform. As such, this type of arrangement is commonly used only for positioning the foot on the pedal and is not used to secure the foot to the pedal platform. Further, the peg and hole adjustment arrangement limits the effective strap length adjustment to one of a series of discreet lengths and is not infinitely adjustable. As such it is difficult to achieve the optimal opening size and fit with the user's foot. Further, by omitting the toe clip, this arrangement does not provide any forward positioning limit or control between the foot and the platform. Still further, this arrangement does not provide a precise fit, and may require several attempts to find a comfortable yet secure adjustment, requiring repeated un-hooking and re-hooking of the strap.

In other applications where only a toe strap is utilized, the strap may include a loop portion having a hook-and-loop or Velcro® closure. The effective length of the strap is adjusted by tearing and re-positioning the hook-and-loop engagement. However, this length adjustment is difficult and clumsy. Also, the hook-and-loop engagement tends to wear out after several adjustments, causing a safety concern where the strength of the closure is weakened. Again, by omitting the toe clip, this arrangement does not provide any forward positioning limit or control between the foot and the platform. Still further, the hook-and-loop function is easily compromised when contaminated with dirt.

In other applications, both the toe clip and strap are omitted in favor of a "clipless" arrangement where the sole of a user's shoe includes a cleat affixed thereto. The cleat may be snapped into engagement with a mating socket of the pedal or platform. This arrangement securely connects the user's foot to the platform, but does not allow the user to simply withdraw their foot from the pedal in a rearward direction. As such this arrangement may be intimidating to users who fear that they may not be able to release their foot at will. Further, this arrangement requires an investment in special cycling shoes with cleats, and dedicated pedals. Still further, many users report having difficulty engaging in, and disengaging from, these clipless pedals. Yet further, the related shoes often do not function well for other activities such as walking, running, or using other exercise equipment.

Accordingly, it is an objective of the present invention to overcome the forgoing disadvantages and provide an improved arrangement for retaining and/or securing a user's foot with a pedal or foot platform.

SUMMARY OF THE INVENTION—OBJECTS AND ADVANTAGES

The present invention utilizes a rotatable adjuster that may be manipulated about a rotational axis for the purpose of increasing or decreasing the effective length of a toe strap and correspondingly varying the size of the opening to receive a users foot and/or to adjust the fit with the user's foot.

The rotatable adjuster may be positioned on the central top part of a user's foot, thus making it easy to reach with the user's hand while seated on a bicycle or similar machine with foot pedals, without need to look down.

Additionally, the rotatable adjuster is intuitive and easy to operate. The user merely need only to rotate the rotary adjuster in one direction to tighten the strap and rotate the opposite direction to loosen. This is a common action and one that most users are familiar with.

Further, the rotatable adjuster may be precisely adjusted to accurately dial-in the perfect fit between the user's foot and the pedal assembly. This affords the user the ability to precisely control the degree of positioning and/or securing of their foot with the pedal for optimal performance and/or user comfort.

In addition, the rotatable adjuster may include a quick release mechanism, instantly enlarging the foot enclosure area, allowing the user to quickly remove their foot from the pedal.

Further features of the present invention will become apparent from considering the drawings and ensuing description.

BRIEF DESCRIPTION OF THE DRAWINGS

The present invention will be more readily understandable from a consideration of the accompanying exemplificative drawings, wherein:

FIG. 1B is a forward-facing orthogonal longitudinal view of the embodiment of FIG. 1a;

FIG. 1c is a downward-facing orthogonal top view of the embodiment of FIG. 1a;

FIG. 2a shows the user's foot and shoe prior to engagement with the pedal assembly.

FIG. 2b shows the user's foot and shoe next advanced in the forward direction to be inserted within the opening of the pedal assembly.

FIG. 2c shows the rotary adjuster next adjusted to reduce the opening perimeter and to tighten the fit between the user's foot and the pedal assembly.

FIG. 2d shows the rotary adjuster next adjusted to increase the opening perimeter and to loosen the fit between the user's foot and the pedal assembly.

FIG. 2e shows the user's foot as next withdrawn from the pedal assembly in the rearward direction.

FIG. 3b is a forward-facing orthogonal view of the embodiment of FIG. 3a;

FIG. 4b is a forward-facing orthogonal view of the embodiment of FIG. 4a;

FIG. 5b is a forward-facing orthogonal view of the embodiment of FIG. 5a;

FIG. 6b is an orthogonal longitudinal view of the embodiment of FIG. 6a;

FIG. 7b is an orthogonal longitudinal view of the embodiment of FIG. 7a;

FIG. 8b is an orthogonal longitudinal view of the embodiment of FIG. 8a;

DETAILED DESCRIPTION OF THE INVENTION

Figure 1A:
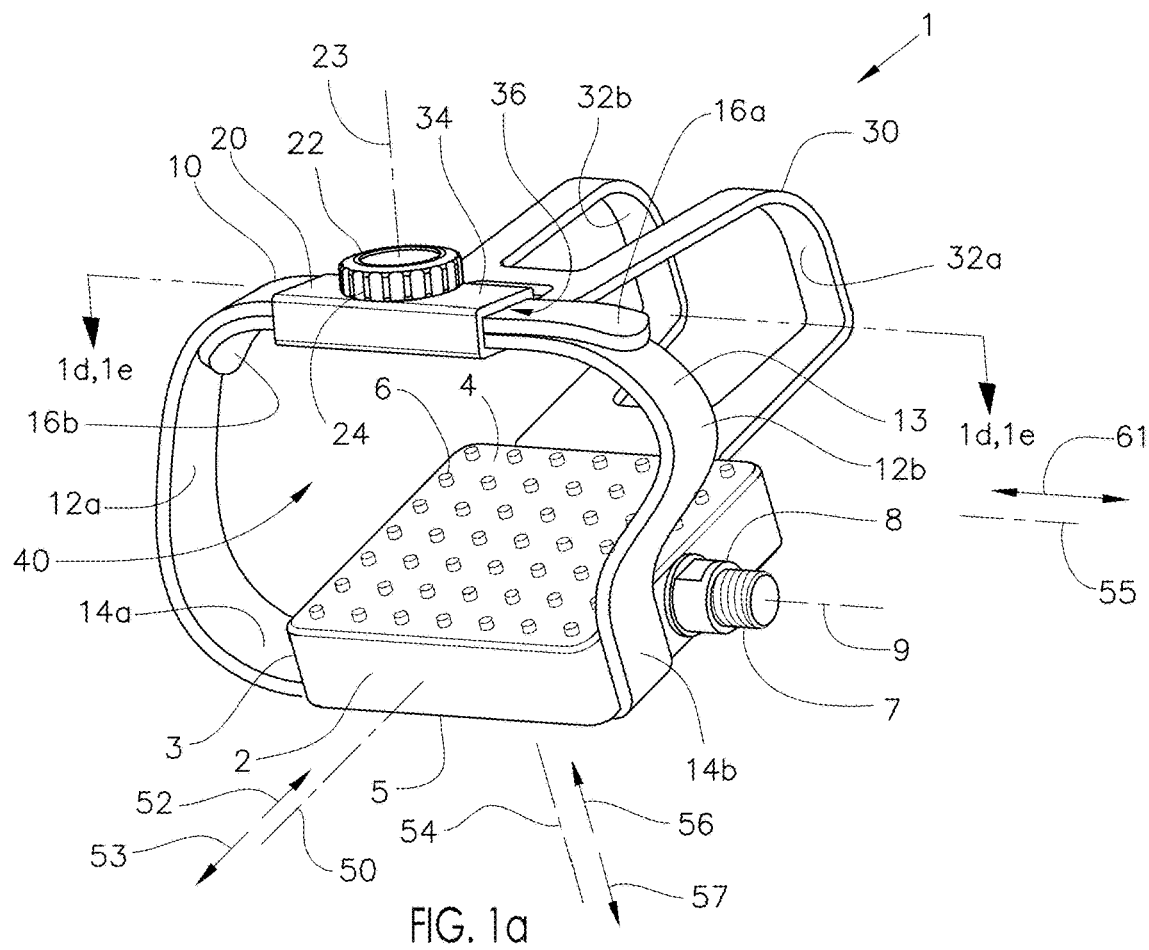
FIG. 1a is a perspective view of a first embodiment of the present invention, including a toe clip with a rotary adjuster anchored thereto.
Figure 1B:
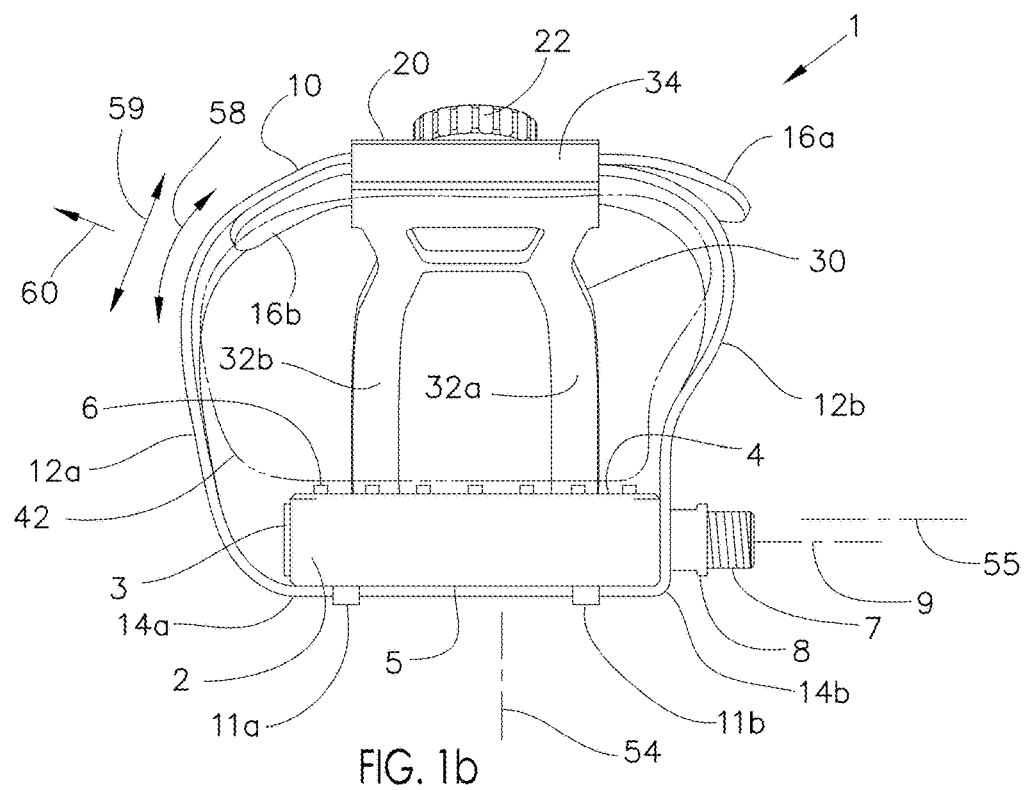
Figure 1C:
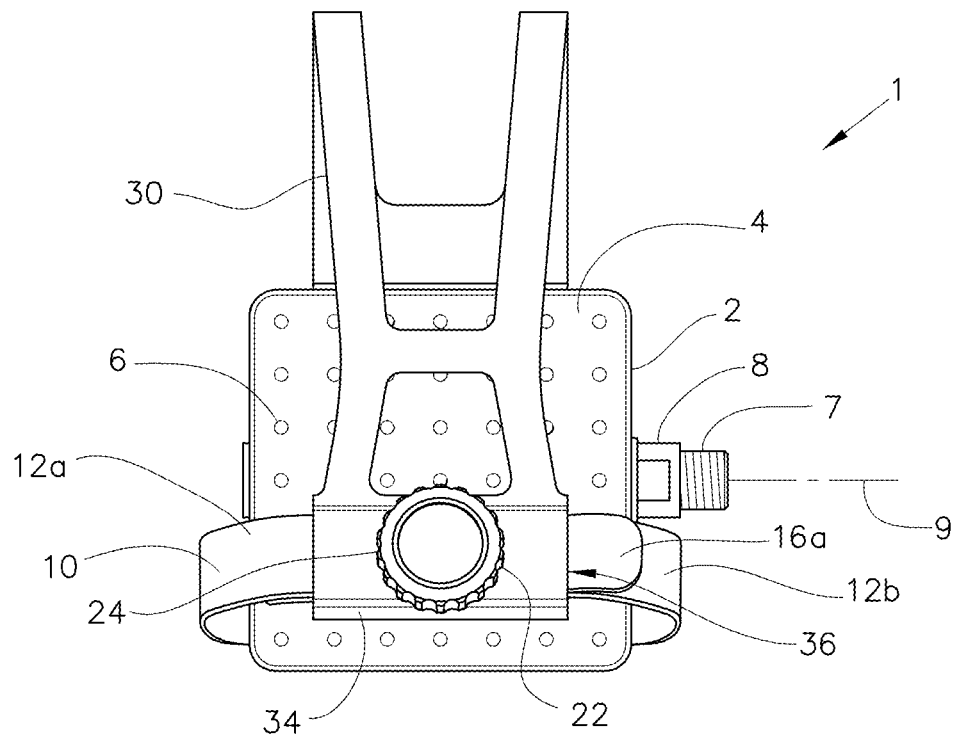

FIGS. 1a-c describes an exemplary pedal assembly 1 that includes a pedal 3, a strap 10, and a toe clip 30. The pedal 3 is shown here to be of generally conventional configuration, including a pedal body 2 having a platform surface 4 to interface with the user's foot (not shown) and that includes pegs 6 to create a configured surface thereon for increased grip and retention with the user's foot (in comparison with a smooth surface). For the purposes of definition herein, the term "platform surface" refers to the surface or plane of the pedal body 2 that supports the sole of the user's foot, irrespective of the type of pedal or its construction. The pedal body 2 is rotatable about spindle 8 and about axial axis 9. Spindle 8 includes an externally threaded boss 7 to threadably connect with a crank arm of a bicycle (not shown) in the conventional manner. Pedal body 2 includes lugs 11a and 11b on the underside 5, which serve as loops to retain the strap 10 thereto.

Toe clip 30 has function similar to conventional toe clips. It has a base portion (obscured) that is retained to the pedal body 2 in the conventional manner and a toe-stop portions 32a and 32b to serve as a limit stop to position the user's foot within the pedal assembly 1 and to limit its forward travel. Toe clip 10 further functions as an auxiliary connection link between that pedal body 2 and the strap 10 at a region near the vertically upward apex of strap 10. Toe clip 30 also includes an adjuster assembly 20 to receive the first portion 12a and second portion 12b of strap 10.

Strap 10 includes a first portion 12a and second portion 12b thereof, both of which are secured and/or retained adjacent their respective base portions 14a and 14b to the pedal body 2 by any of a variety of methods known in industry. The strap 10 is shown here to be directly retained and engaged to the pedal body 2. Strap 10 is considered an elongate element having an effective elongate length along an elongate axis that extends circumferentially along the portion of the strap 10 between base portions 14a and 14b and serve to wrap around the user's foot. The "effective length" of the strap is defined herein as the length of the portion of the strap that contributes to the opening perimeter 42. Strap 10 includes a loop portion 13 thereof that extends between its anchor point at the base portion 14a and its opposed anchor point with the pedal body 2 at base portion 14b. First portion 12a and second portion 12b include respective end portions 16a and 16b that overlap each other and interface with the adjuster assembly 20. The term "strap" and "toe strap" are used interchangeably throughout this specification.

As shown in FIG. 1b, the strap 10 is a continuous elongate element that wraps around the underside 5 of pedal body 2 and threads through lugs 11a and 11b. It is understood that this is merely one representative method to retain the strap 10 to the pedal body 2. Lugs 11a and 11b serve as loops having circumferentially-extending openings (obscured) therein to receive the strap 10 therethrough. These lugs 11a and 11b serve as retaining means to retain the strap 10 thereto and to limit displacement therebetween along the vertical axis 54 and longitudinal axis 50. However, lugs 11a and 11b may allow the strap 10 to slide somewhat in the circumferential direction 58. A wide range of alternate arrangements are envisioned, including retaining means that will additionally retain the strap 10 to the pedal body 2 along the circumferential direction. Other alternate arrangements are envisioned as well, including an arrangement of minimum retaining that simply wraps around the underside 5 without lugs 11a and 11b. The most important requirement for such retaining being that the strap may serve to retain the user's foot to the platform surface 4 by limiting displacement therebetween, particularly in a vertically upward direction 56.

Following are some direction and orientation conventions referred to throughout this description. The "longitudinal axis" 50 is an axis generally along the length of the user's foot and commonly perpendicular to the axial axis 9. A longitudinally forward direction 52 is a direction along the longitudinal axis 50 that extends from the user's heel toward the toe. The longitudinally rearward direction 53 is opposed to the longitudinally forward direction 52. The "lateral axis" 55 is generally perpendicular to the longitudinal axis 50 and generally parallel to the axial axis 9. A laterally inward orientation denotes an orientation proximal to the lateral midpoint of the pedal body 2 and a laterally outward orientation denotes an orientation distal from the midpoint of the pedal body 2. The "vertical axis" 54 extends in a direction generally perpendicular to both the longitudinal axis 50 and the lateral axis 55. A vertically upward direction 56 extends generally upwardly and perpendicular to the platform surface, while a vertically downward direction 57 is opposed to the vertically upward direction 56. A "lateral direction" 61 extends generally parallel to the lateral axis 55.

The strap 10, platform surface 4 and toe clip 30 cooperate to define an opening 40 to receive the user's foot (not shown) in the conventional manner, with opening 40 having an opening perimeter 42 as shown in FIG. 1b. Following are some direction and orientation conventions referred to throughout this description. The "circumferential direction" 58 is an arcuate vector that extends along the opening perimeter 42. The "tangential direction" 59 is a straight vector that is generally tangent to the opening perimeter 42 at any point thereon. The "radial direction" 60 is a direction perpendicular to the tangential direction 59.

Figure 1D:
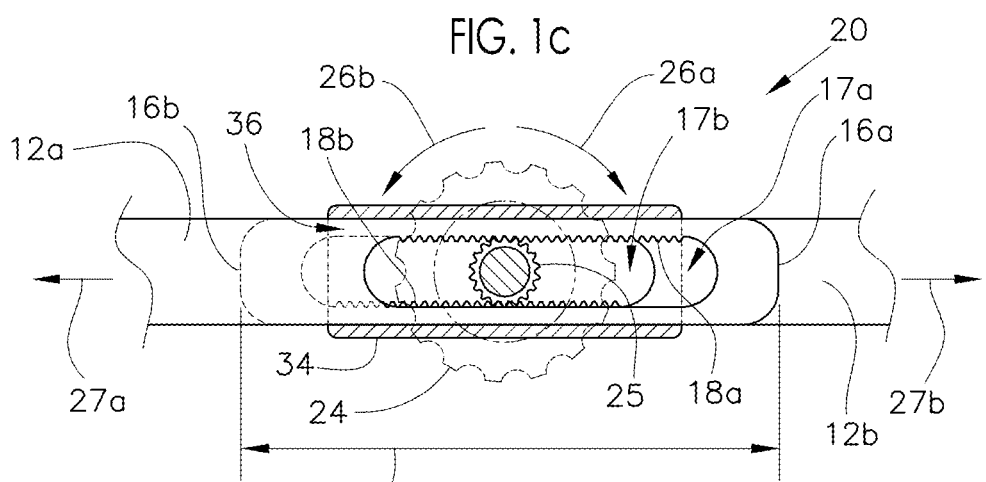
FIG. 1d is an orthogonal cross section detail view, taken along 1d, 1e-1d, 1e, of the embodiment of FIG. 1a, showing the rotary adjuster rotatable about a radial axis, including a rack and pinion mechanism.
Figure 1E:
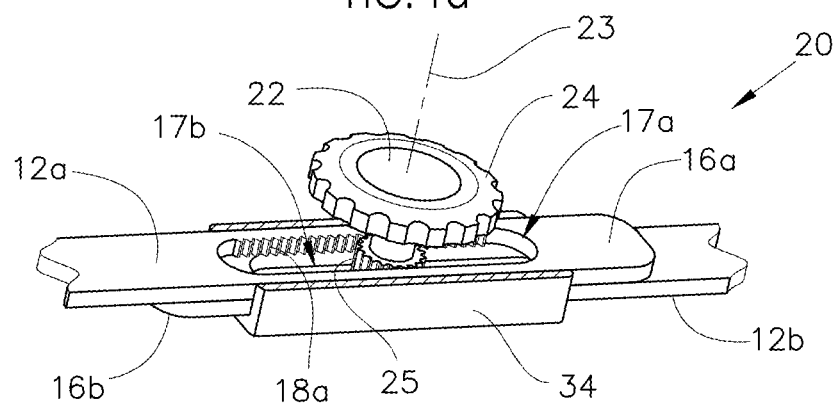
FIG. 1e is a perspective partial cross section detail view, taken along 1d, 1e-1d, 1e, of the embodiment of FIG. 1a, showing the rotary adjuster mechanism with the sleeve portion in cross section.

The adjuster assembly 20 includes a sleeve portion 34 that is a unitary part of the toe clip 30. Sleeve portion 34 includes a circumferentially extending opening 36 therethrough to receive the end portions 16a and 16b and the rotary adjuster 22. Rotary adjuster 22 is rotatable about rotary axis 23 relative to the toe clip 30 and strap 10. As shown in FIGS. 1d-e, it may be seen that rotary adjuster 22 includes a knob portion 24 and a pinion portion 25 that serves as a pinion gear in a rack-and-pinion engagement as shown. End portions 16a and 16b each include elongated openings 17a and 17b respectively, which each include rack gear teeth 18a and 18b respectively. The opening 36 serves to guide and maintain alignment of end portions 16a and 16b therein and also to maintain engagement between pinion portion 25 and rack gear teeth 18a and 18b. Sleeve portion 34 also includes cross holes (obscured) that serve to pilot and maintain the aligned and free rotation of the rotary adjuster 22 engaged thereto.

Rotation of rotary adjuster 22 in the clockwise direction 26a serves to actively drive the gear engagement between pinion portion 25 and rack gear teeth 18a and 18b such that end portions 16a and 16b will be driven in respective directions 27a and 27b. This serves to increase the circumferential overlap 19 between end portions 16a and 16b, thereby reducing and shortening the opening perimeter 42 and correspondingly reduce the area of opening 40. Conversely, rotation of rotary adjuster 22 in the counterclockwise direction 26b serves to reduce the circumferential overlap 19 between end portions 16a and 16b and to actively drive end portions 16a and 16b in directions opposed to directions 27a and 27b. This serves to expand and lengthen the opening perimeter 42 and correspondingly increase the area of opening 40. Thus, rotation of rotary adjuster 22 serves to selectively circumferentially adjust the fit between the strap 10 and the user's foot between a tightened orientation where the strap 10 is radially close to or slightly constricting the user's foot and a loosened orientation where the strap 10 includes radial clearance with the user's foot. The benefit of such adjustment is well understood in industry and with prior art arrangements.

Rotary adjuster 22, including knob portion 24, rotate about rotary axis 23, which is shown here to extend in a generally radial and vertically upward direction and correspondingly perpendicular to the elongate axis of the strap 10. The knob portion 24 is positioned adjacent the vertically upward apex of the strap 10 and is significantly upwardly raised and distal from the pedal body 2 as compared to prior art designs, where the buckle is vertically lower and closer to the pedal body. This raised orientation results in a shorter reach for a user seated on a corresponding bicycle (not shown) to allow the user to make adjustments to the rotary adjuster 22 much more easily. It is noted that the rotary adjuster 22 and adjuster assembly 20 are anchored in the toe clip 30, which may be considered a third element in addition to the pedal 3 and the strap 10.

Figure 2A:
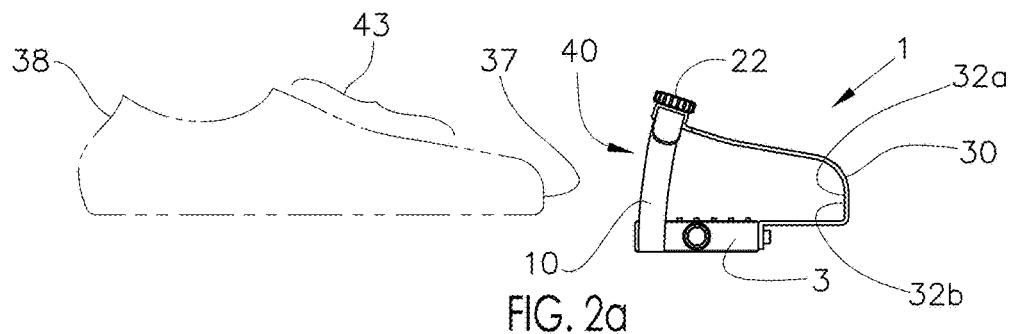
FIGS. 2a-e are axial plan views of the embodiment of FIG. 1a, describing the sequential steps of engagement between the user's foot and shoe and the pedal assembly.
Figure 2B:
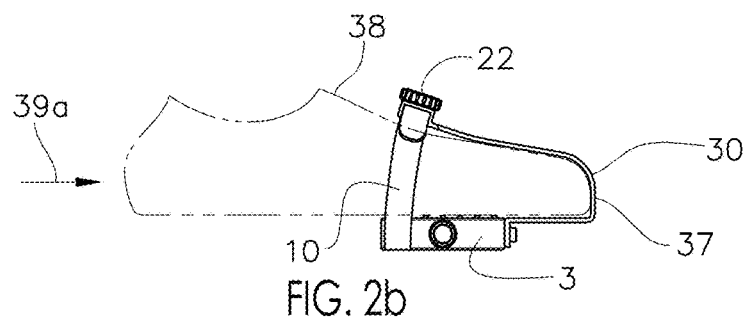
Figure 2C:
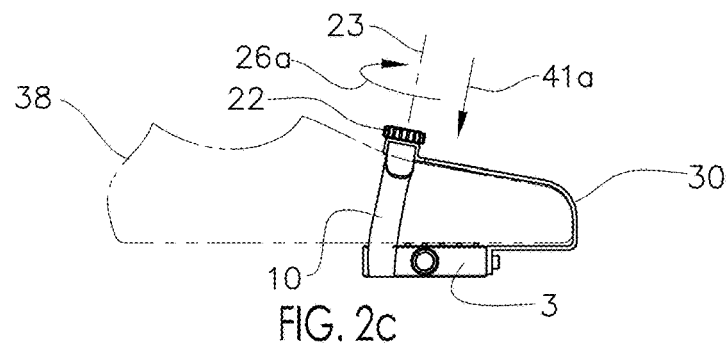

FIGS. 2a-e describe the sequential steps of operation of the pedal assembly 1 of FIGS. 1a-e, where the user engages/disengages their foot 38 to/from the pedal assembly 1. FIG. 2a shows the user's foot 38 in alignment for assembly with the pedal assembly 1. FIG. 2b shows the foot 38 next advanced in the longitudinally forward direction 39a, such that the toe portion 37 enters the opening 40 until it contacts the toe stop portions 32a and 32b. The strap 10 is located to circumferentially wrap around the forefoot/midfoot region 43 of the user's foot. Next, the rotary adjuster 22 is rotated in direction 26a, as shown in FIG. 2c, to selectively reduce the opening perimeter 42 to a tightened orientation, which causes the toe clip 30 to flex in direction 41a such that the strap 10 and toe clip 30 may constrict on the forefoot region 43 of foot 38. In some cases, the user may adjust the rotary adjuster so that the strap 10 only lightly contacts the foot 38, or has slight clearance with the foot 38, allowing the user to easily slide and disengage their foot 38 from the pedal assembly 1 in direction 39b. In other cases, the user may prefer a snug and somewhat constricted fit between the strap 10 and the foot, which serves to restrain the disengagement of the foot 38 and positions the foot 38 more positively. It is preferable that the strap 10 is positioned to circumferentially wrap and interface with the forefoot/midfoot region 43 of the user's foot. This is the optimum position to provide stability of the interface between the foot 38 and the pedal assembly 1, while also importantly providing freedom of movement of the user's ankle. Ankle articulation is known to be a key aspect of efficient pedaling technique during bicycle riding.

Figure 2D:
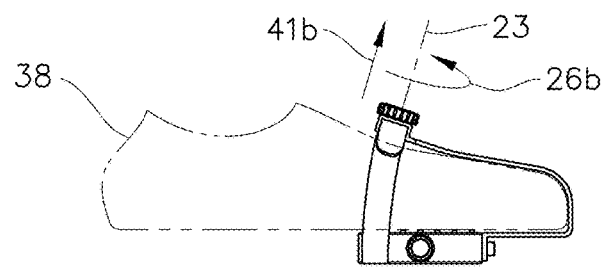
Figure 2E:
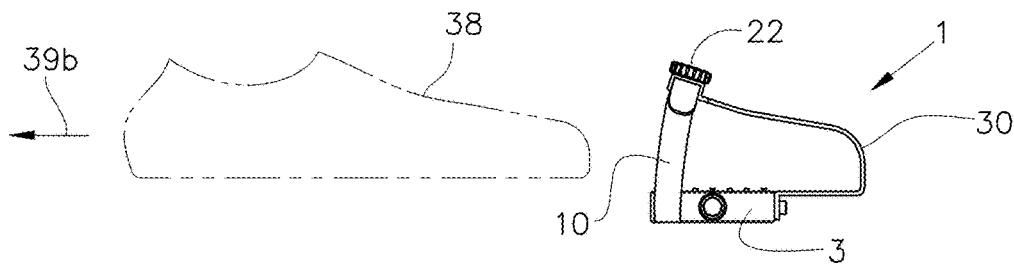

Next, to withdraw the foot 38 from the pedal assembly 1, the user first rotates the rotary adjuster 22 in direction 26*b* as shown in FIG. 2*d*, to selectively increase the opening perimeter 42 to a loosened orientation, which also releases the toe clip 30 to flex in direction 41*b*. This serves to release any aforementioned constriction and allows the foot 38 to be easily withdrawn from the pedal assembly 1 in the rearward direction 39*b*, thus releasing the foot from the pedal assembly las next shown in FIG. 2*e*. The strap 10 and toe clip 30, which may be considered a foot retention system of the pedal assembly 1, remain connected to the pedal body 2 when the foot is withdrawn therefrom. The aforementioned sequential steps may be applied to any of the embodiments described herein.

Figure 3A:
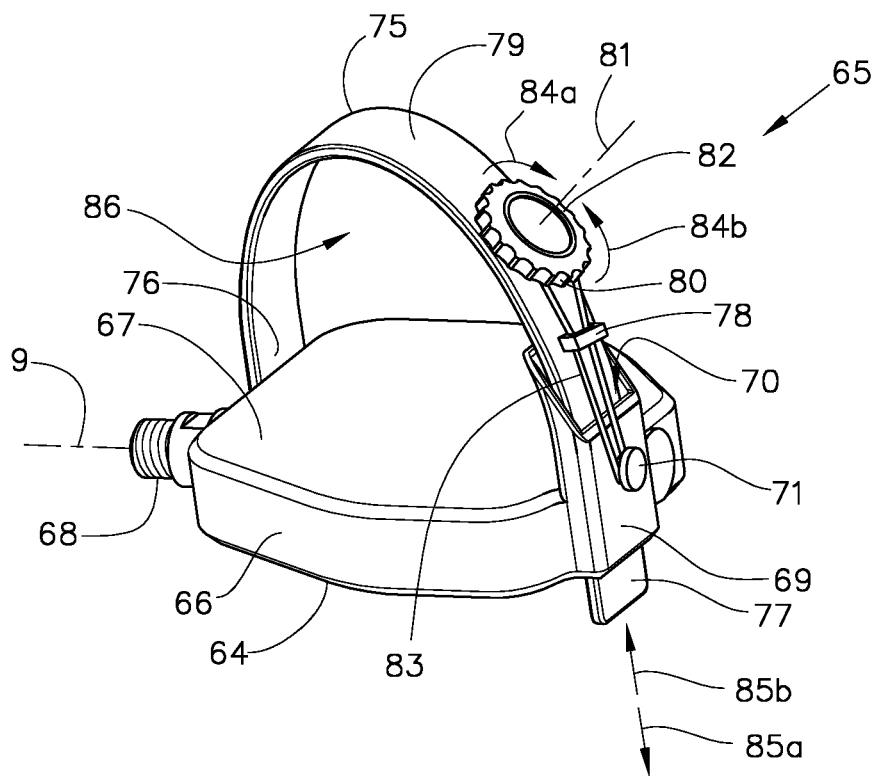
FIG. 3a is a perspective view of a second embodiment of the present invention, including a toe strap with a rotary adjuster anchored thereto, the rotary adjuster including a spool winding mechanism and a lace.
Figure 3B:
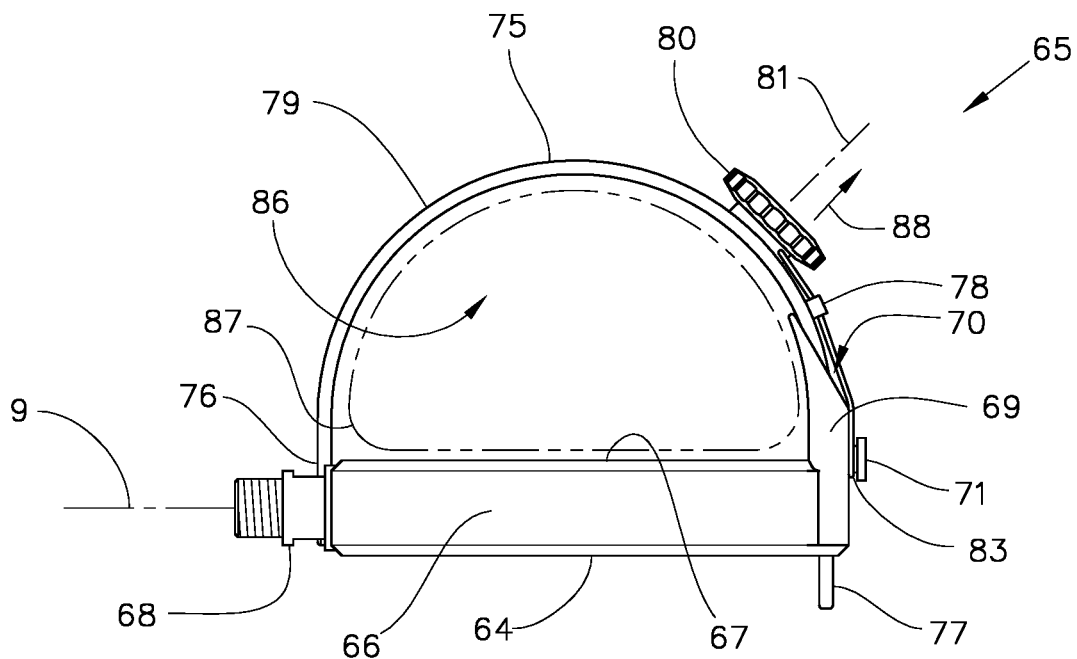

FIGS. 3*a-b* describe an exemplary pedal assembly 65 that includes a pedal 64 and a strap 75. The pedal 64 includes a pedal body 66 having a platform surface 67 to interface with the user's foot (not shown). The pedal body 67 is rotatable about spindle 68 and about axial axis 9. Spindle 68 includes an externally threaded boss to threadably connect with a crank arm of a bicycle (not shown) in the conventional manner. Pedal body 66 includes sleeve portion 69 with boss 71 and with opening 70 therethrough to receive the strap 75 as shown. In contrast to the embodiment of FIGS. 1*a-e*, the embodiment of FIGS. 3*a-b* is shown here to without the inclusion of a toe clip.

Strap 75 includes: a base portion 76 that is retained or otherwise joined to the pedal body 66 by any of a variety of methods known in industry; an end portion 77 extending through opening 70; and a rotary adjuster 80. Strap 75 is considered an elongate element having an elongate length along an elongate axis that extends along the portion of the strap 75 between base portion 76 and end portion 77. Loop portion 79 of strap 75 is considered the portion of the strap 75 between its point of joinder with the pedal body 66 at the base portion 76 and its opposed anchor point with the pedal body 66 via the boss 71, lace 83, and rotary adjuster 80. The strap 75 and platform surface 67 cooperate to define an opening 86 to receive the user's foot (not shown) in the conventional manner and including an opening perimeter 87 as shown in FIG. 3*b*.

Rotary adjuster 80 is an assembly where a knob portion 82 thereof is rotatable about rotary axis 81 relative to the strap 75. Knob portion 82 connected to a spool portion (concealed) that serves as a spool to wind lace 83 thereon. Rotary adjuster 80 is representative of a variety of spool-and-lace systems known in industry such as the Boa® system. Lace 83 comprises a loop of cord that connects between boss 71 and spool portion. Strap 75 includes a loop or guide 78 to align and guide the lace 83 relative to the strap 75. Rotation of knob portion 82 about rotary axis 81 in the clockwise direction 84*a* serves to wind, reel-in, and take-up the lace 83 on the spool portion, effectively reducing the exposed length of the lace 83 to pull the rotary adjuster 80 toward boss 71, thereby actively drawing strap 75 through opening 70 in direction 85*a*. This serves to correspondingly reduce and shorten the opening perimeter 87 and correspondingly reduce the area of opening 86. It may be considered that lace 83 constitutes a portion of loop portion 79 that extends between base portion 76 and boss 71. The end portion 77 serves to guide the strap 75 through opening 70.

Knob portion 82 rotates about rotary axis 81, which is shown here to extend in a generally radial direction and that is correspondingly perpendicular to the elongate axis of the strap 75. Unlike the embodiment of FIGS. 1*a-e*, the rotary adjuster 80 is anchored to the strap 75 at a location that is offset from the vertically upward apex of the strap 75.

Rotation of knob portion 82 in the counterclockwise direction 84*b* serves to unwind and release the lace 83, allowing the lace to extend distally therefrom to increase the circumferential distance between the rotary adjuster 80 and the boss 71. Strap 75 may now be manipulated by the user to stretch and enlarge the loop portion 79 and correspondingly increase the opening perimeter 87 and to draw the end portion 77 through opening 70 in direction 85*b* to correspondingly increase and lengthen the opening perimeter 87 and correspondingly increase the area of opening 86. Dependent on the stiffness and design of the strap 75, the loop portion 78 may simply spring open without requiring the manual manipulation. Since the lace 83 is comprised of cord, it can effectively carry load in tension, but it is not effective at carrying load in compression. Rotation of rotary adjuster 22, serves to selectively adjust the circumferential fit between the strap 75 and the user's foot (not shown) between a tightened orientation to constrict or retain the user's foot and a loosened orientation where the user's foot may be released from the pedal assembly 65. An example of such a rotary adjuster arrangement is found in the Boa® "S-series" models of rotary adjuster.

In an alternative rotary adjuster arrangement, instead of rotating the knob portion in direction 84*b*, the user needs only to pull up the knob portion 82 to displace it in direction 88 relative to strap 75, which serves to release a catch in the spool and permit it to passively unwind and release the lace 83. In this arrangement, rotation of rotary adjuster 22 in direction 84*a*, serves to selectively adjust the circumferential fit between the strap 75 and the user's foot (not shown) to a tightened orientation, and non-rotatably manipulating the rotary adjuster 22 serves to adjust the circumferential fit between the strap 75 and the user's foot (not shown) to a loosened orientation where the user's foot may be released from the pedal assembly 65. An example of such a rotary adjuster arrangement is found in the Boa® "M-series" models of rotary adjuster.

For definition herein, the term "active" refers to a case where the rotary adjuster is positively coupled to the strap such that its rotation serves to correspondingly displace the strap to vary the length of the opening perimeter. Conversely, the term "passive" "refers to a case where the rotary adjuster is passively coupled to the strap such that its rotation serves only to release the position of the strap, requiring the application of an external force to vary the length of the opening perimeter. In the example of FIGS. 3*a-b* rotation of the knob portion 82 in direction 84*a* serves to increase tension in the lace 83 to actively drive the strap 75 in direction 85*a*, while rotation of the knob portion 82 in direction 84*b* serves merely to extend and reduce tension in the lace 83 to passively release the strap 75 such that an external force (i.e. manipulation by the user to enlarge the opening 86) is required to displace end portion 77 in direction 85*b*. Alternatively, the strap 75 may have sufficient spring-back elasticity to enlarge the opening 86 without requiring user manipulation.

Figure 4A:
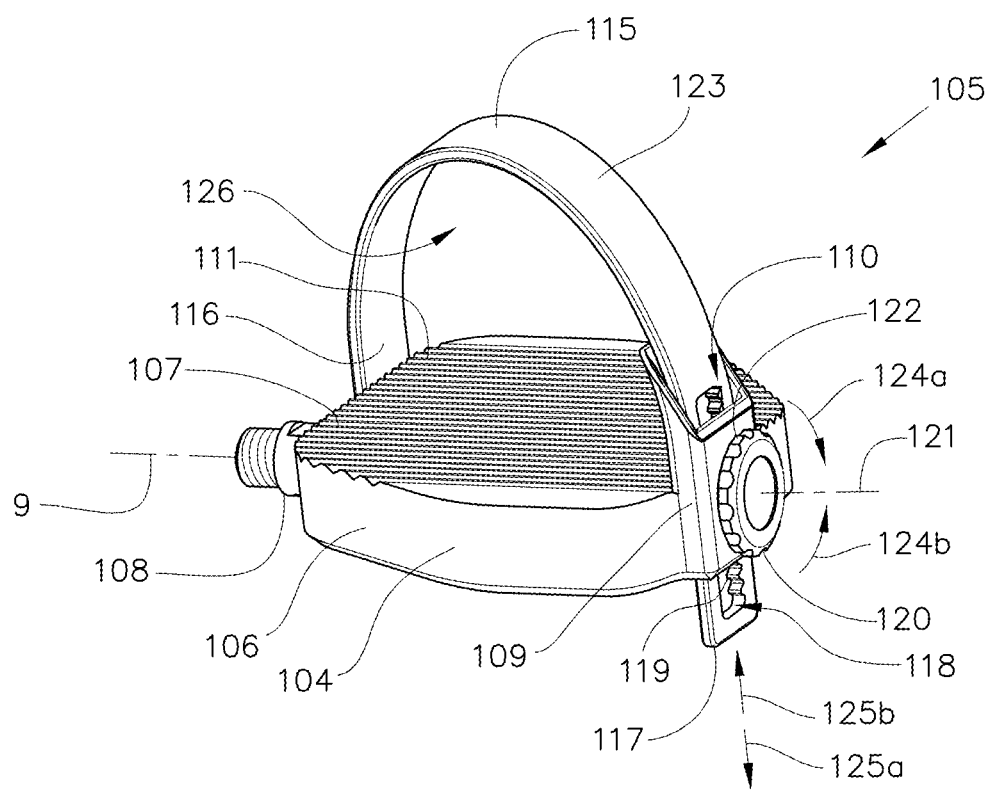
FIG. 4a is a perspective view of a third embodiment of the present invention, including a toe strap and a rotary adjuster anchored to the pedal, the rotary adjuster rotatable about a radial axis and including a rack-and-pinion mechanism.
Figure 4B:
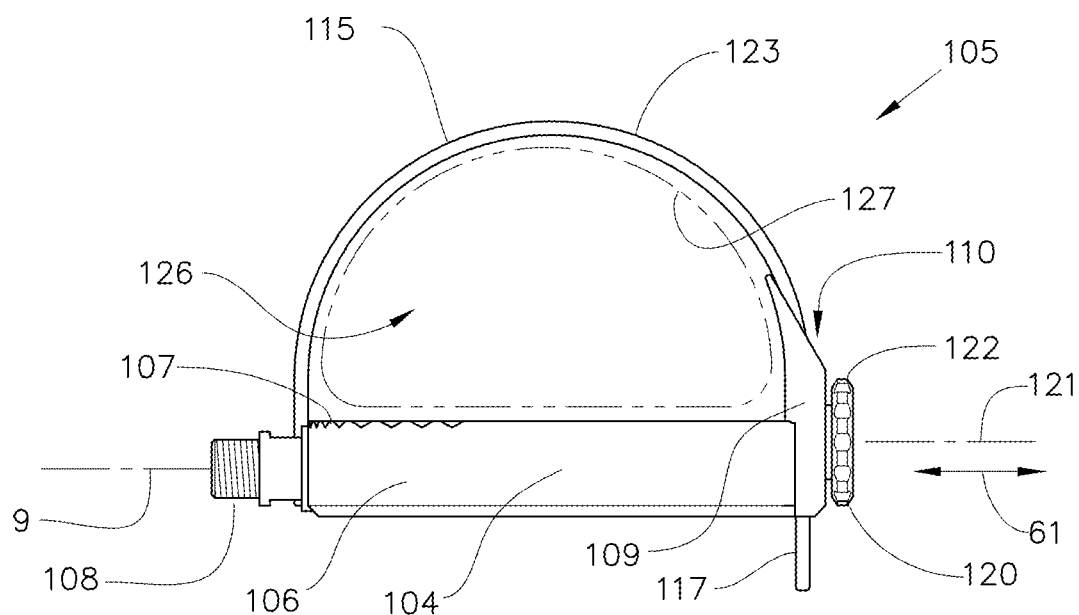

FIGS. 4*a-b* describe an exemplary pedal assembly 105 that includes a pedal 104, a strap 115, and a rotary adjuster 120. The pedal 104 includes a pedal body 106 having a platform surface 107 to interface with the user's foot (not shown) and that includes ribs 111 to create a configured surface thereon for increased grip and engagement with the user's foot (in comparison with a smooth surface).

The pedal body 107 is rotatable about spindle 108 and about axial axis 9. Spindle 108 includes an externally threaded boss to threadably connect with a crank arm of a bicycle (not shown) in the conventional manner. Pedal body 106 includes sleeve portion 109 with opening 110 therethrough to receive the strap 115 therethrough. The opening 110 serves to guide and maintain alignment of end portion 117 therein and also to maintain engagement between pinion gear (obscured) and rack gear teeth 119. In contrast to the embodiment of FIGS. 1*a-e*, the embodiment of FIGS. 4*a-b* is shown here without including a toe clip.

Strap 115 includes: a base portion 116 that is retained or joined to the pedal body 106 by any of a variety of methods known in industry; an end portion 117 extending through opening 110 and having an elongated opening 118 with rack gear teeth 119. Strap 115 is considered an elongate element having a elongate length between base portion 116 and end portion 117. Loop portion 123 of strap 115 is considered the portion of the strap 115 between the base portion 116 and its opposed anchor point with the pedal body through the gear engagement between rack gear teeth 119 and pinion gear (obscured) of the rotary adjuster 120. The strap 115 and platform surface 107 cooperate to define an opening 126, with opening perimeter 127, to receive the user's foot (not shown) in the conventional manner as shown in FIG. 4*b*.

Rotary adjuster 120 is rotatable about rotary axis 121 relative to the strap 115. Rotary adjuster 120 includes a knob portion 122 connected to a pinion gear (not shown) that serves as a pinion gear in a rack-and-pinion gear engagement as shown. Sleeve portion 109 also includes cross holes (obscured) that serve to pilot and maintain the aligned and free rotation of the rotary adjuster 120 engaged thereto. The rotary adjuster 120 is shown here to be retained or joined or otherwise anchored to the pedal body 106, and is rotatable about a rotary axis 121 that extends in a generally lateral direction 61.

Rotation of knob portion 122 in the clockwise direction 124*a* about rotary axis 121 serves to actively drive the gear engagement between pinion gear and rack gear teeth 119 such that end portion 117 will drive in direction 125*a* relative to the sleeve 109 and pedal body 106. This serves to reduce and shorten the opening perimeter 127 and correspondingly reduce the area of opening 126. Conversely, rotation of knob portion 122 in the counterclockwise direction 124*b* serves to actively drive end portion 117 in direction 125*b*. This serves to expand and lengthen the opening perimeter 127 and correspondingly increase the area of opening 126. Thus, rotation of rotary adjuster 120 serves to selectively adjust the circumferential fit between the strap 115 and the user's foot between a tightened orientation for positional control between the user's foot and the pedal assembly 105 and a loosened orientation where the user's foot may be released from the pedal assembly 105.

Figure 5A:
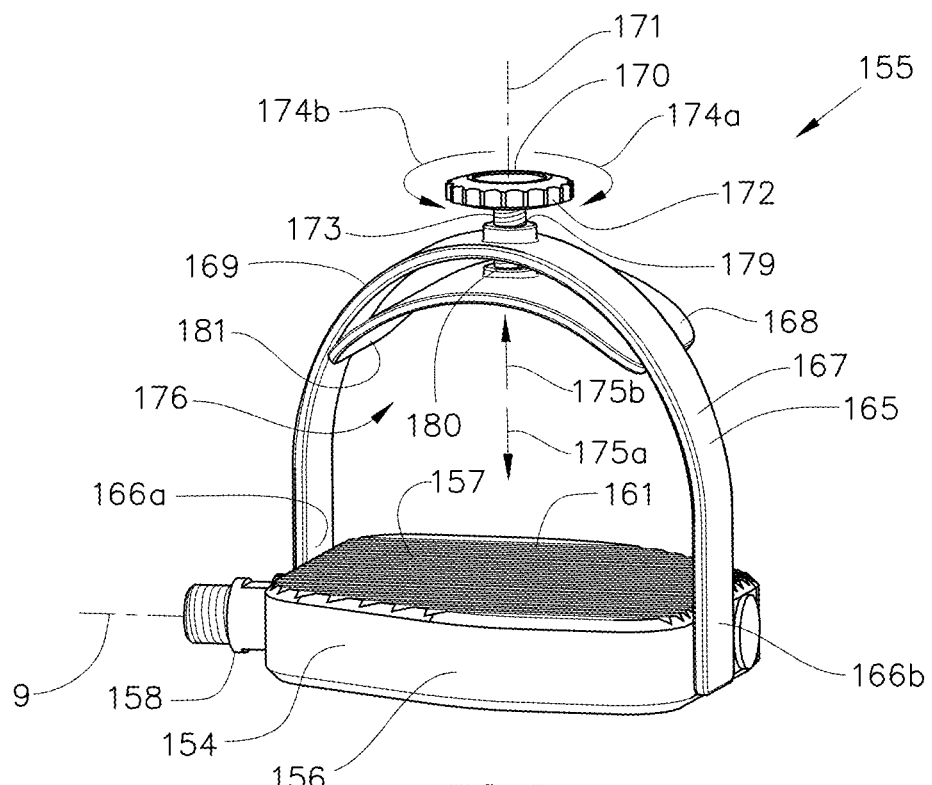
FIG. 5a is a perspective view of a fourth embodiment of the present invention, including a toe strap and a movable pad, the rotary adjuster rotatable about a radial axis and including a threadable adjustment mechanism between the toe strap and the movable pad.
Figure 5B:
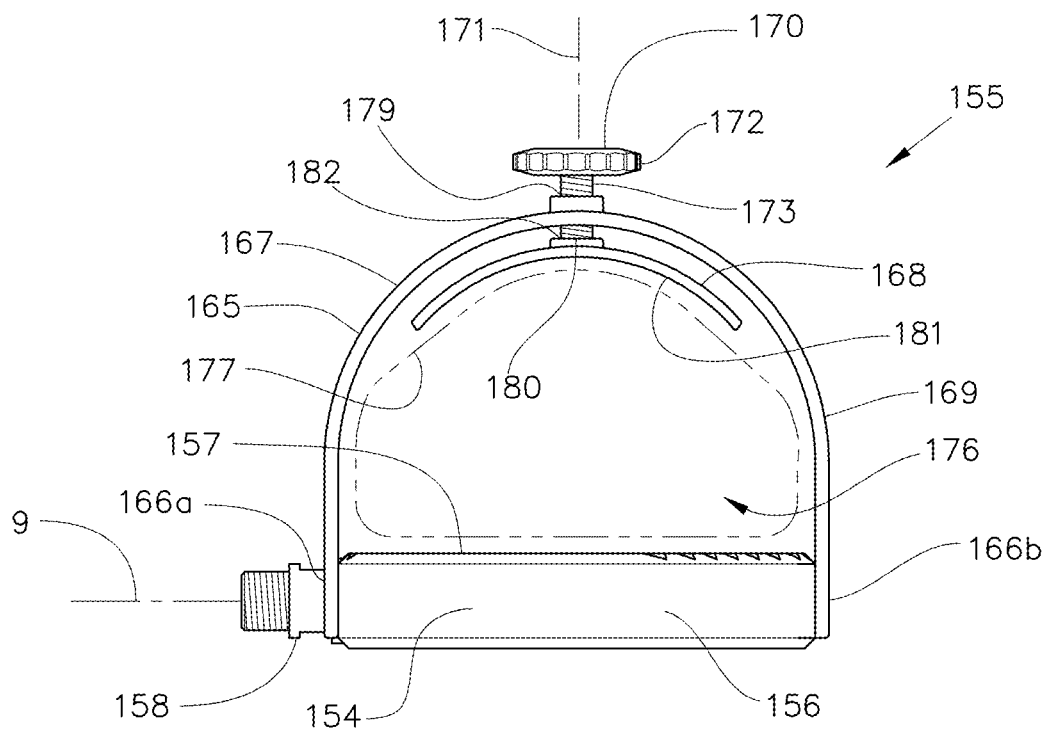

FIGS. 5*a-b* describe an exemplary pedal assembly 155 that includes a pedal 154 and a strap assembly 165. Strap assembly 165 includes a first strap portion 167, a second strap portion 168, and a rotary adjuster 170. The pedal 154 includes a pedal body 156 having a platform surface 157 to interface with the user's foot (not shown) and that includes ribs 161 to create a configured surface thereon for increased grip and engagement with the user's foot (in comparison with a smooth surface). The pedal body 157 is rotatable about spindle 158 and about axial axis 9. Spindle 158 includes an externally threaded boss to threadably connect with a crank arm of a bicycle (not shown) in the conventional manner.

First strap portion 167 includes: base portions 166*a* and 166*b* that are retained or joined to the pedal body 156 by any of a variety of methods known in industry; a loop portion 165 between base portions 166*a* and 166*b* and spaced from the platform surface 157; and an internally threaded hole 179 to threadably receive the external threads of rotary adjuster 170. First strap portion 167 is considered an elongate element having an elongate length between base portions 166*a* and 166*b*. Second strap portion 168 includes a bearing surface 181 to interface with user's foot (not shown) and a socket 182 to receive the radially inboard end of the rotary adjuster 170.

The rotary adjuster 170 includes a knob portion 172, an externally threaded shaft 173 having a radially inboard end 180 thereof. The shaft 173 has a threadable engagement with the internally threaded hole 179 of the first strap portion 167 and the end 180 is fitted within socket 182 of the second strap portion 168. The first strap portion 167, second strap portion 168, and platform surface 157 cooperate to define an opening 176 to receive the user's foot (not shown) in the conventional manner and including an opening perimeter 177 as shown in FIG. 5*b*.

Rotary adjuster 170 is rotatable about rotary axis 171 relative to the first strap portion 167. The rotary adjuster 120 is shown here to be anchored to first strap portion 167, with a rotary axis 171 that extends in a generally radial direction. The knob portion 172 is positioned adjacent the vertically upward apex of the first strap portion 167 and is significantly upwardly raised and distal from the platform surface 157 as compared to prior art designs Rotation of knob portion 172 in the clockwise direction 174*a* serves to actively tighten and drive the thread engagement between threaded shaft 173 and hole 179 such that end 180 will bear against the socket 182 to actively drive the second strap portion 168 radially inwardly in direction 175*a* toward the platform surface 157. This serves to reduce and shorten the opening perimeter 177 and correspondingly reduce the area of opening 176. Conversely, rotation of knob portion 172 in the counterclockwise direction 174*b* serves to loosen the aforementioned threadable engagement, allowing the second strap portion 168 to move radially outwardly in direction 175*b*. This serves to expand and lengthen the opening perimeter 177 and correspondingly increase the area of opening 176. Thus, rotation of rotary adjuster 170 serves to selectively adjust the fit between the strap assembly 165 and the user's foot between a tightened orientation where the second strap portion 168 is radially close to or slightly constricting the user's foot and a loosened orientation where the user's foot may be released from the pedal assembly 155. FIGS. 5*a-b* schematically describe an arrangement where a rotary adjuster 170 may be utilized to radially displace a second strap portion 168 relative to a first strap portion 167. This is in contrast to FIGS. 1*a-e* where a rotary adjuster 22 may be utilized to circumferentially displace a first (strap) portion 12*a* relative to a second (strap) portion 12*b*.

Figure 6A:
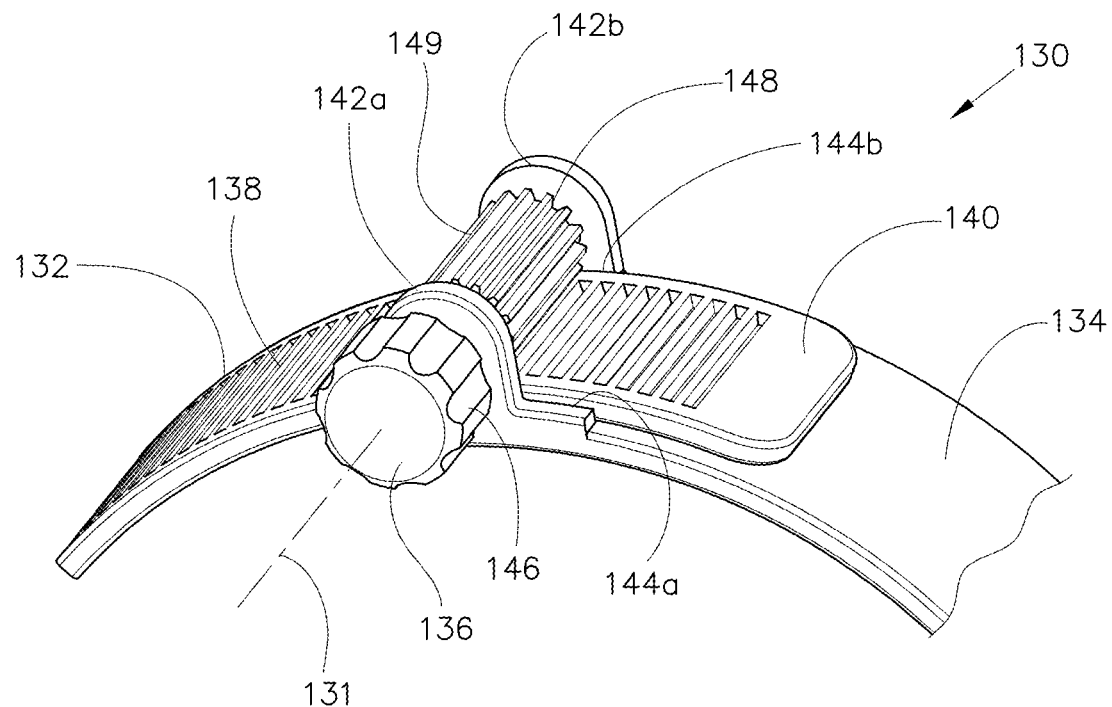
FIG. 6a is a perspective view of a fifth embodiment of the present invention, including first and second toe strap portions, the rotary adjuster anchored to the second strap portion and rotatable about a longitudinal axis and including a rack and pinion engagement with the first strap portion.
Figure 6B:
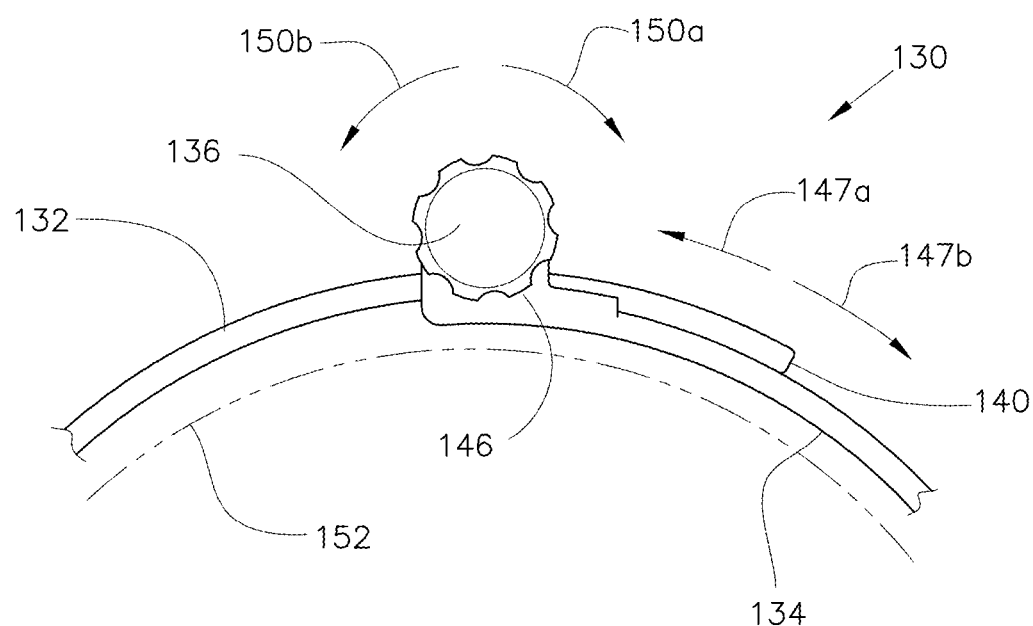

FIGS. 6*a-b* describe an alternate rotatable adjuster assembly 130 that may be substituted for some of the other rotatable adjusters described hereinabove. Rotatable adjuster assembly 130 includes a first strap portion 132, a second strap portion 134, and a rotary adjuster 136. First strap portion 132 includes rack gear teeth 138 on its radially outward surface to mate with the gear teeth 149 of pinion gear 148. Second strap portion 134 includes flanges 142*a* and 142*b* that longitudinally straddle the first strap portion 132 and also include holes (obscured) therein to receive the rotary adjuster 136 and to permit rotation therebetween about rotary axis 131. Flanges 142a and 142b also include guide faces 144a and 144b respectively to provide alignment and guiding of the first strap portion 132 therebetween. Rotary adjuster 136 includes knob portion 146 and pinion gear 148 with gear teeth 149. First strap portion 132 is radially constrained between pinion gear 148 and second strap portion 134 to maintain gear engagement between gear teeth 149 and rack gear teeth 138.

Rotation of knob portion 146 about rotary axis 131 in the counterclockwise direction 150b serves to rotate the pinion gear 148 and to drive the gear engagement between gear teeth 149 and rack gear teeth 138 such that end portion 140 will actively drive in direction 147b to increase the circumferential overlap between first strap portion 132 and second strap portion 134 thereby reducing and shortening the opening perimeter 152 as described hereinabove. Conversely, rotation of knob portion 146 in the clockwise direction 150a serves to actively drive end portion 140 in direction 147a relative to second strap portion 134 and correspondingly reduce the circumferential overlap between first strap portion 132 and second strap portion 134. This serves to expand and lengthen the opening perimeter 152. As such, this adjustment of the opening perimeter 152 has similarity to that described hereinabove. FIGS. 6a-b describes an example where the rotary adjuster 136 rotates about a rotary axis 131 that extends in a generally longitudinal direction. The rotary adjuster 136 is shown here to be anchored in the second strap portion 134.

Figure 7A:
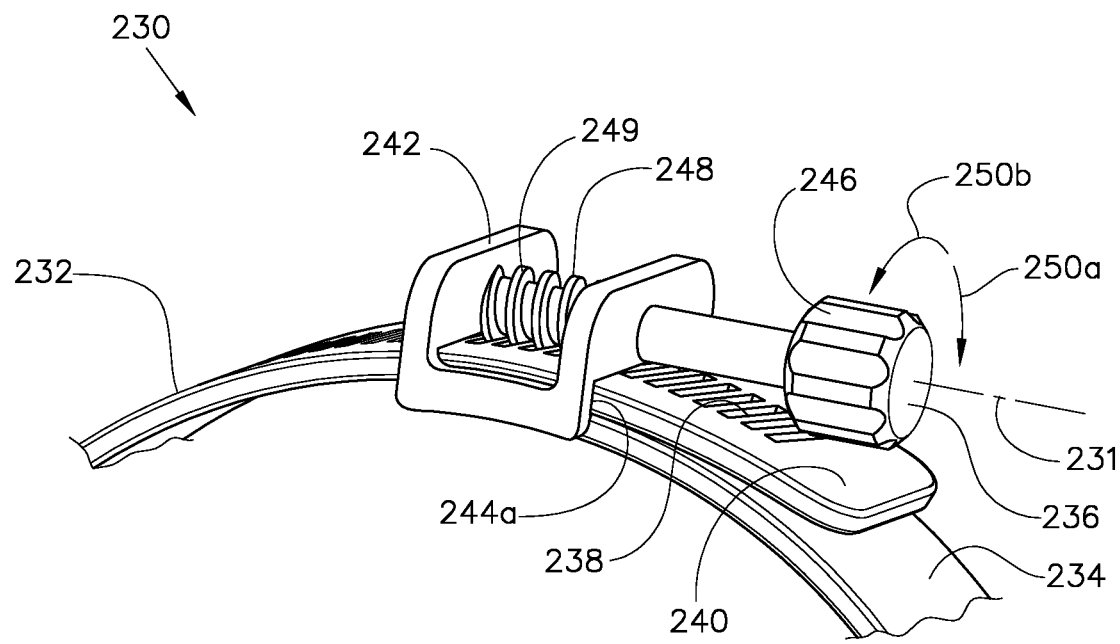
FIG. 7a is a perspective view of a sixth embodiment of the present invention, including first and second toe strap portions, the rotary adjuster anchored to the second strap portion and rotatable about a tangential axis and including a worm drive engagement with the first strap portion.
Figure 7B:
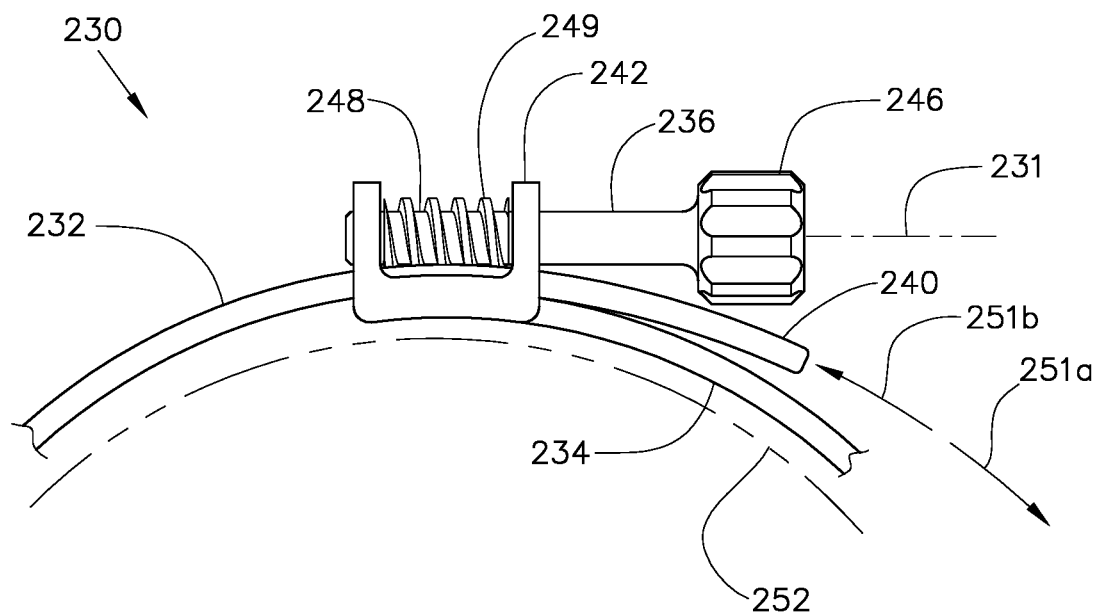

FIGS. 7a-b describe an alternate rotatable adjuster assembly 230 that may be substituted for some of the other rotatable adjusters described hereinabove. Rotatable adjuster assembly 230 includes a first strap portion 232, a second strap portion 234, and a rotary adjuster 236. First strap portion 232 includes rack gear teeth 238 on its radially outward surface to mate with the worm gear rib 249 of worm gear 248. Second strap portion 234 includes bracket 242 that laterally straddles the first strap portion 232 and also include holes (obscured) therein to receive the rotary adjuster 236 and to permit rotation therebetween about rotary axis 231. Bracket 242 also include guide faces 244a and 244b (obscured) to provide alignment and guiding of the first strap portion 232 therebetween. Rotary adjuster 236 includes knob portion 246 and worm gear 248 with worm gear rib 249. First strap portion 232 is radially constrained between worm gear 248 and second strap portion 234 to maintain gear engagement between worm gear rib 249 and rack gear teeth 238. It is noted that rotatable adjuster assembly 230 is similar to the adjustment assembly of worm drive hose clamps known in industry.

Rotation of knob portion 246 about rotary axis 231 in the clockwise direction 250a serves to actively drive the rotary adjuster 236 and worm gear engagement between worm gear rib 249 and rack gear teeth 238 such that end portion 240 will actively drive in direction 251a to increase the circumferential overlap between first strap portion 232 and second strap portion 234 thereby reducing, shortening, and closing the opening perimeter 252 as described hereinabove. Conversely, rotation of knob portion 246 in the counterclockwise direction 250b serves to reduce the circumferential overlap between first strap portion 232 and second strap portion 234 and to actively drive end portion 240 in direction 251b relative to second strap portion 234. This serves to expand, lengthen, and open the opening perimeter 252. As such, this adjustment of the opening perimeter 252 is similar to that described hereinabove. FIGS. 7a-b describes an exemplary embodiment where the rotary adjuster 236 may be rotated about a rotary axis 231 that extends in a generally tangential direction. The rotary adjuster 236 is anchored in the second strap portion 234.

FIGS. 8a-d describe an alternate rotatable adjuster assembly 190 that may be substituted for some of the other rotatable adjuster assemblies described hereinabove. Rotatable adjuster assembly 190 includes a first strap portion 192, a second strap portion 194, and a toggle link 196. First strap portion 192 includes end portion 193 having pivot pin 197a extending along pivot axis 198a. Second strap portion 194 includes end portion 195 having pivot pin 197b extending along pivot axis 198b. Toggle link 196 includes tab handle 199 and arms 200a and 200b to longitudinally straddle the end portions 193 and 195 and to also includes holes 201a and 201b therethrough. Holes 201a and 201b receive pins 197a and 197b respectively to create a first hinge engagement between toggle link 196 and end portion 193 about pivot axis 198a and a second hinge engagement between toggle link 196 and end portion 195 about pivot axis 198b.

Figure 8A:
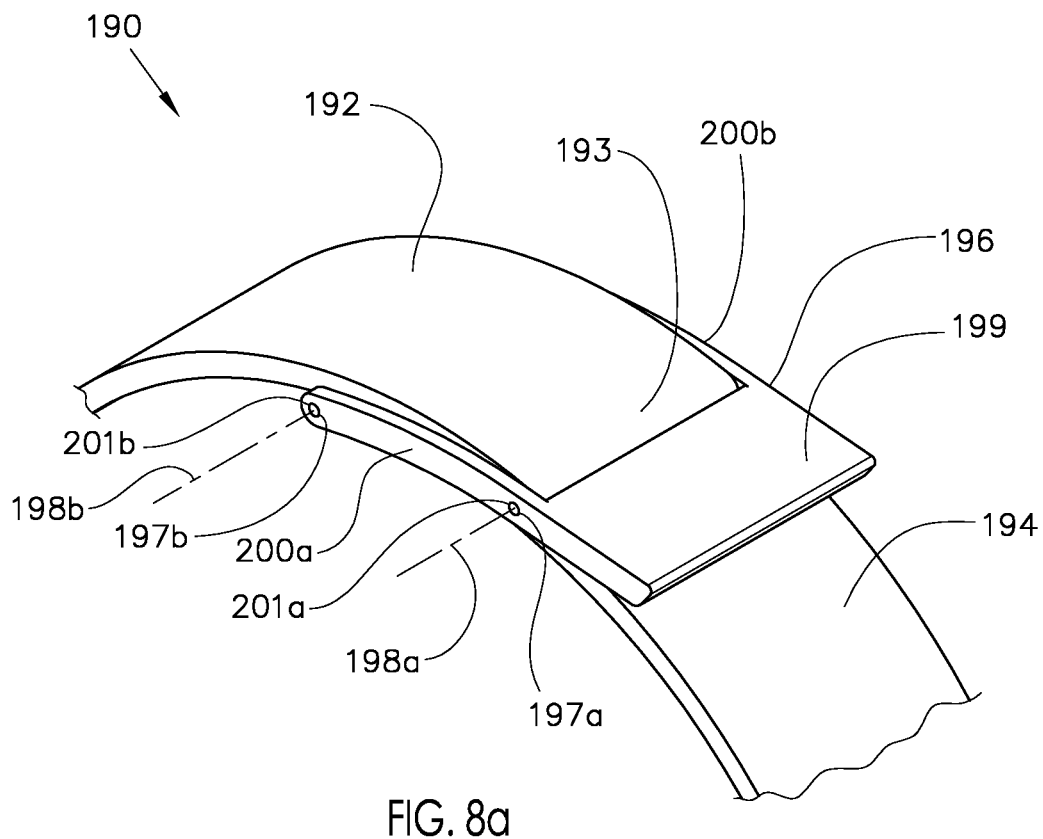
FIG. 8a is a perspective view of a seventh embodiment of the present invention, including first and second strap portions, the rotary adjuster anchored to both strap portions and rotatable about a longitudinal axis and including a toggle engagement with the second strap portion, with the toggle engagement shown in a closed orientation to shorten the effective length of the strap.
Figure 8B:
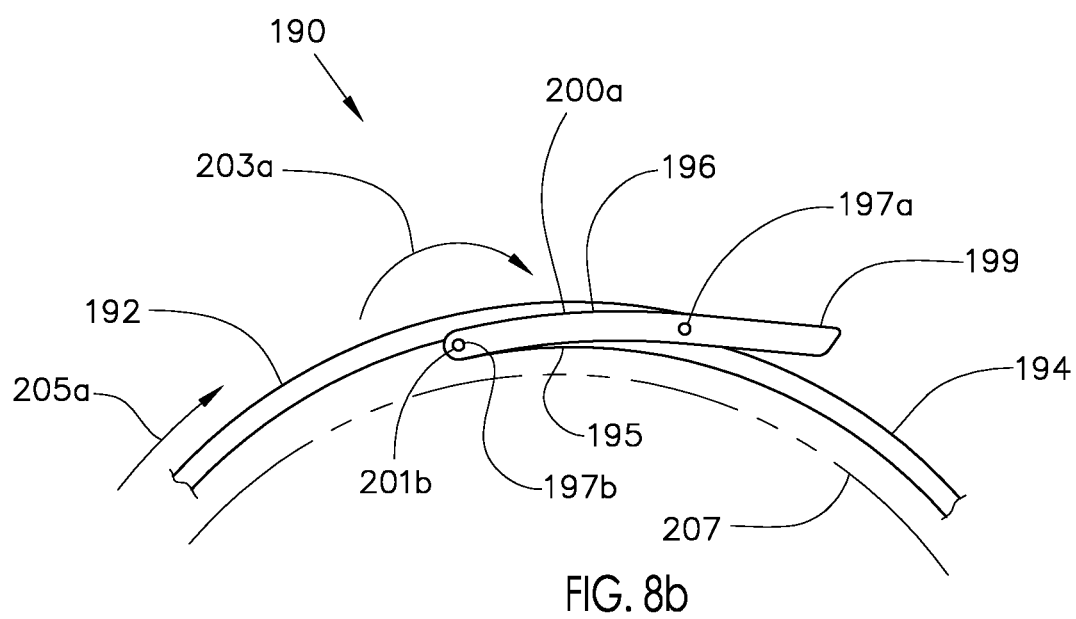

As shown in FIGS. 8a-b toggle link 196 has been rotated in the clockwise direction 203a about pivot axis 198b. This rotation causes first strap portion 192 to be displaced in direction 205a such that end portion 193 is circumferentially overlapping end portion 195. This is considered the closed or tightened orientation of the adjuster assembly 190 where the circumferential length of adjuster assembly 190 is shortened, and where first strap portion 192 is proximal to second strap portion 194, and which corresponds to a shortened opening perimeter 207.

Figure 8C:
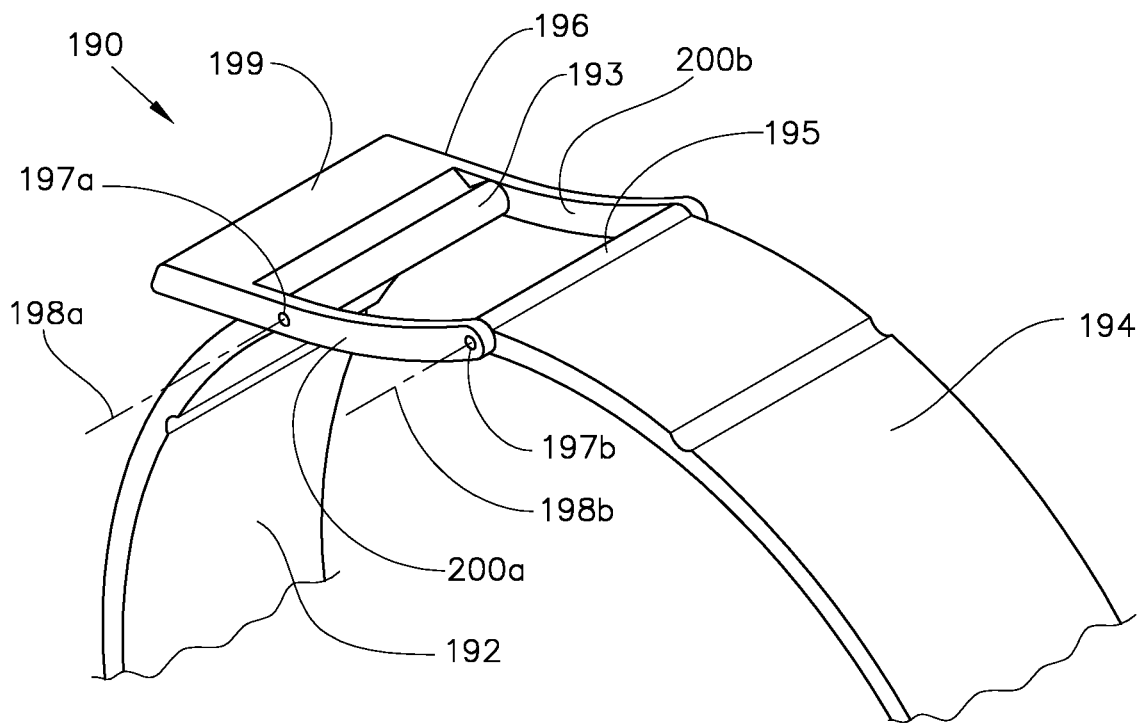
FIG. 8c is a perspective view of the embodiment of FIG. 8a, with the toggle engagement shown in an open orientation to lengthen the effective length of the strap.
Figure 8D:
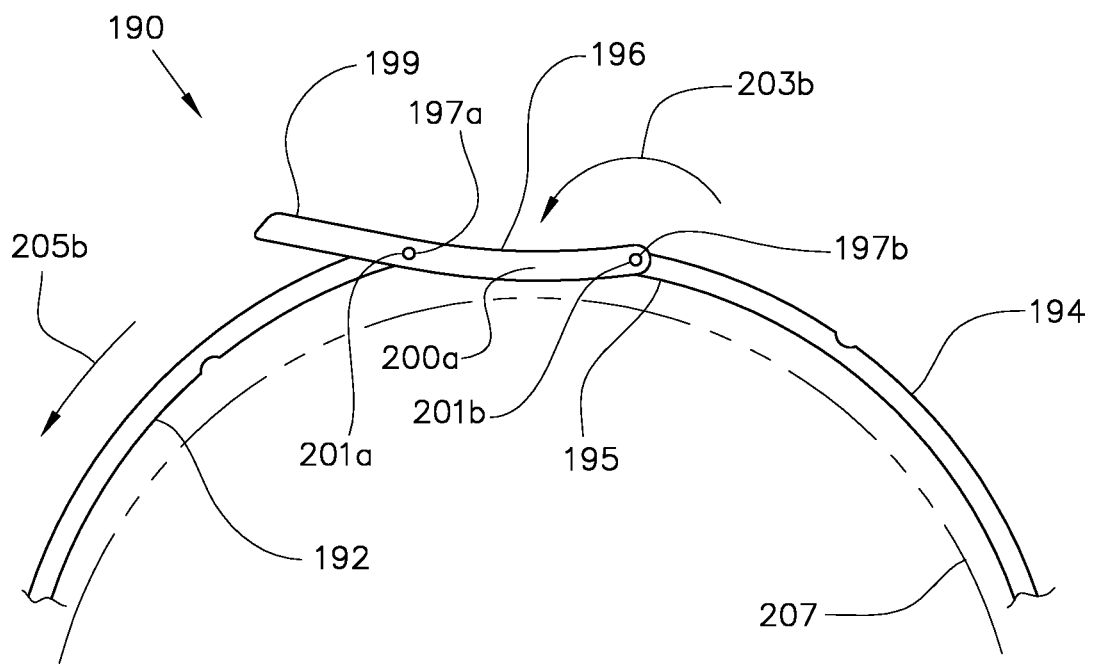
FIG. 8d is an orthogonal longitudinal view of the embodiment of FIG. 8a as shown in FIG. 8c.

Next, as shown in FIGS. 8c-d, toggle link 196 may be rotated in counterclockwise direction 203b about pivot axis 198b. This causes first strap portion 192 to be displaced in direction 205b such that end portion 193 is circumferentially spaced from end portion 195. This is considered the open or loosened orientation of the adjuster assembly 190 where the circumferential length of adjuster assembly 190 is lengthened, and where first strap portion 192 is distal to second strap portion 194, and which corresponds to an expanded and lengthened opening perimeter 207. Adjuster assembly 190 may be considered a toggle link mechanism that is known in industry, where the toggle link is circumferentially fixed and pivoted with respect to both end portions 193 and 195. Toggle link 196 serves as a rotary adjuster that rotates about rotary axis 198b, which is shown here to extend in a generally longitudinal direction. The toggle link 196 is anchored to both the first strap portion 192 and the second strap portion 194.

It is noted that the toggle link 196 serves as a rotary adjuster that is rotated about pivot axis 198b in directions 203a or 203b by approximately 180 degrees between the loosened and tightened orientations. It may be seen that the rotation of toggle link 196 by an angle greater than 360 degrees about pivot axis 198b is not feasible due to obvious geometry constraints. It may be preferable that this rotation provide an "over-center" geometry condition in the closed orientation where the toggle mechanism will not inadvertently be displaced to the open orientation. Such an over-center geometry arrangement is known in industry. This limited rotation (to less than 360 degrees) of the toggle link 196 is in contrast to the rotary adjusters 22, 80, 120, and 170 corresponding to their respective embodiments, which do not have such a geometric limitation and that may be rotated by 360 degrees or greater between their respective tightened and loosened orientations. In fact, this greater angle of rotation may be preferable because it may provide greater mechanical advantage and/or more precise control over the length of the circumferential perimeter.

While my above description contains many specificities, these should not be construed as limitations on the scope of the invention, but rather as exemplifications of embodiments thereof. For example:

The embodiments described herein show the strap, as a separate element that is connected and/or retained to the pedal body. The strap may alternatively be monolithic with the pedal body and/or molded as a continuous component.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A foot retention system including:
   a pedal having a pedal platform with a longitudinal axis, a vertical axis, and a lateral axis;
   a strap, including a first base portion, a second base portion and a loop portion therebetween;
   a rotary adjuster connected to said strap;
   wherein said first base portion and said second base portion are retained to said pedal platform and said loop portion is vertically spaced from said pedal platform;
   wherein said strap and said pedal platform defines an opening to receive a foot therein, said opening having an opening perimeter;
   wherein said rotary adjuster is rotatable about a rotary axis to adjust the length of said opening perimeter;
   wherein said rotary adjuster includes a rack and pinion gear mechanism, wherein a pinion gear is rotated about said rotary axis to adjust the length of said opening perimeter.

2. The foot retention system according to claim 1, wherein said rotary adjuster is circumferentially fixed to said pedal platform about said opening perimeter.

3. The foot retention system according to claim 1, wherein said rotary adjuster is circumferentially fixed to said strap about said opening perimeter.

4. The foot retention system according to claim 1, wherein said strap may be considered to be a first element and said pedal platform may be considered to be a second element, and including a third element, wherein said third element is connected to at least one of said strap and said pedal platform, and wherein said rotary adjuster is circumferentially fixed to said third element.

5. The foot retention system according to claim 4, wherein said third element is a toe clip.

6. The foot retention system according to claim 1, wherein said rotary axis extends in radial direction that is primarily radial.

7. The foot retention system according to claim 1, wherein said rotary axis extends in a direction that is primarily tangential.

8. The foot retention system according to claim 1, wherein said rotary axis extends in a direction that is primarily lateral.

9. The foot retention system according to claim 1, wherein said rotary adjuster is positioned adjacent the vertically upward apex of said strap.

10. The foot retention system according to claim 1, wherein said rotary adjuster is positioned circumferentially offset from the vertical apex of said strap.

11. The foot retention system according to claim 1, wherein said strap is a singular element and said rotary adjuster serves to adjust the position of said second base portion relative to said pedal platform.

12. The foot retention system according to claim 1, wherein said loop includes a first strap portion and a second strap portion, wherein said rotary adjuster serves to adjust the circumferential position of said first strap portion relative to said second strap portion.

13. The foot retention system according to claim 1, wherein said adjustment of the length of said opening perimeter includes a loosened orientation corresponding to an increased length of said opening perimeter and a tightened orientation corresponding to a reduced length of said opening perimeter relative to said loosened orientation; wherein, in said loosened orientation, a user's foot may be freely withdrawn from said foot retention system in a rearward direction.

14. The foot retention system according to claim 13, wherein said rotary adjuster is rotatable about said rotary axis by greater than 360 degrees between said loosened orientation and said tightened orientation.

15. The foot retention system according to claim 13, wherein said rotary adjuster is rotatable about said rotary axis by less than 360 degrees between said loosened orientation and said tightened orientation.

16. The foot retention system according to claim 13, wherein said foot retention system remains connected to said pedal when the user's foot is withdrawn therefrom.

17. The foot retention system according to claim 1, wherein said strap is directly connected to said pedal platform.

18. The foot retention system according to claim 1, including a toe clip, wherein said toe clip provides a forward limit stop to the user's foot relative to the pedal platform.

19. The foot retention system according to claim 1, including a toe clip, wherein the toe clip serves as a link to connect said loop portion to said pedal platform.

20. The foot retention system according to claim 1, wherein said rotation of said rotary adjuster serves to actively reduce the length of said opening perimeter in a first rotation direction and serves to actively increase the length of said opening perimeter in a second direction of rotation opposed to said first direction of rotation.

21. The foot retention system according to claim 1, wherein said rotary adjuster is anchored to said pedal platform.

22. A foot retention system including:
   a pedal having a pedal platform with a longitudinal axis, a vertical axis, and a lateral axis;
   a strap, including a first base portion, a second base portion and a loop portion therebetween;
   a rotary adjuster connected to said strap;
   wherein said first base portion and said second base portion are retained to said pedal platform and said loop portion is vertically spaced from said pedal platform;
   wherein said strap and said pedal platform defines an opening to receive a foot therein, said opening having an opening perimeter;
   wherein said rotary adjuster is rotatable about a rotary axis to adjust the length of said opening perimeter;
   wherein said strap is considered to be a first element and said pedal platform is considered to be a second element, and including a third element, wherein said third element is connected to at least one of said strap and said pedal platform, and wherein said rotary adjuster is circumferentially fixed to said third element about said opening perimeter; and wherein said rotation of said rotary adjuster serves to actively reduce the length of said opening perimeter.

23. The foot retention system according to claim 22, wherein said third element is a toe clip.

24. A foot retention system including:
a pedal having a pedal platform with a longitudinal axis, a vertical axis, and a lateral axis;
a strap, including a first strap portion and a second strap portion, wherein said first strap portion includes a first base portion, a second base portion and a loop portion therebetween, wherein said second strap portion is radially spaced from said first strap portion;
a rotary adjuster connected to said strap;
wherein said first base portion and said second base portion are retained to said pedal platform and said loop portion is vertically spaced from said pedal platform;
wherein said strap and said pedal platform defines an opening to receive a foot therein, said opening having an opening perimeter;
wherein said rotary adjuster is rotatable about a rotary axis to adjust the length of said opening perimeter;
wherein said rotary adjuster is engaged to said first strap portion and to said second strap portion and wherein said rotation about a said rotary axis serves to adjust the radial position of said second strap portion relative to said first strap portion.

25. The foot retention system according to claim 24, wherein said rotary adjuster includes a screw thread mechanism, wherein a helical thread is rotated about said rotary axis to adjust said perimeter length.

26. The foot retention system according to claim 24, wherein said rotary adjuster is positioned adjacent the vertically upward apex of said strap.

* * * * *